United States Patent [19]

Yonekura et al.

[11] Patent Number: 4,650,830
[45] Date of Patent: Mar. 17, 1987

[54] THERMOPLASTIC ELASTOMER COMPOSITION AND PROCESS FOR PREPARATION THEREOF

[75] Inventors: Katsuyoshi Yonekura; Akira Uchiyama; Akira Matsuda, all of Ichihara, Japan

[73] Assignee: Mitsui Petrochemical Industries, Ltd., Tokyo, Japan

[21] Appl. No.: 615,244

[22] Filed: May 30, 1984

[30] Foreign Application Priority Data

May 31, 1983 [JP] Japan ................................ 58-95073
May 31, 1983 [JP] Japan ................................ 58-95074
Feb. 17, 1984 [JP] Japan ................................ 59-27350

[51] Int. Cl.$^4$ .................. C08L 23/16; C08L 23/26; C08L 23/20
[52] U.S. Cl. .................. 525/193; 525/194; 525/211; 525/240; 525/88; 525/197; 525/198; 525/232; 525/237
[58] Field of Search .............. 525/240, 192–194, 525/197

[56] References Cited

U.S. PATENT DOCUMENTS 3,806,558  4/1974  Fischer ............................. 525/240
4,211,852  7/1980  Matsuda et al. .................... 525/240
4,311,807  1/1982  McCullough et al. ............... 525/197
4,368,280  1/1983  Yui et al. .......................... 525/240
4,454,092  6/1984  Shimizu et al. .................... 264/349

*Primary Examiner*—Carman J. Seccuro
*Attorney, Agent, or Firm*—Wenderoth, Lind & Ponack

[57] ABSTRACT

Disclosed is a thermoplastic elastomer composition excellent in the injection fusion bondability and the surface gloss, which comprises (1) an amorphous ethylene/α-olefin copolymer (a) and (2) (i) a lowly crystalline copolymer (b) of propylene with an α-olefin having at least 4 carbon atoms, (ii) a polymer (d) composed mainly of 1-butene or (iii) a combination of the copolymer (b) or the polymer (d) with a crystalline polymer (c) composed mainly of propylene, wherein the component (1) is present in an amount of 10 to 95% by weight based on the total amount of the components (1) and (2), the component (2) is present in an amount of 5 to 90% by weight based on the total amount of the components (1) and (2), and the component (1) or the components (1) and (2) are partially crosslinked.

The partial crosslinking is effected by grafting of a radical-polymerizable monomer having at least two polymerizable groups.

5 Claims, No Drawings

THERMOPLASTIC ELASTOMER COMPOSITION AND PROCESS FOR PREPARATION THEREOF

BACKGROUND OF THE INVENTION (1) Field of the Invention

The present invention relates to a thermoplastic elastomer composition excellent in injection fusion bondability and surface gloss.

(2) Description of the Prior Art

An olefin type thermoplastic elastomer, for example, a partially crosslinked elastomer (TPE) comprising a crystalline polyolefin and an amorphous ethylene/α-olefin copolymer, shows an elastomeric property similar to that of a vulcanized rubber, and also shows a moldability equivalent to the moldability of a thermoplastic resin such as polyethylene or polypropylene. By utilizing these properties, the olefin type thermoplastic elastomer is molded in the same manner as ordinary resins, and molded article is used in the fields where the elastomeric property is required, for example, as a vehicle bumper, an exterior moleskin, a window shield gasket, an emblem, an interior surface sheet or a gasket for a construction material.

This TPE does not possess the surface gloss required in the market, and an improvement of the surface gloss has been desired especially for exterior moleskins and emblems of vehicles where great importance is attached to the surface gloss.

As means for offsetting the poor surface gloss of a shaped TPE article, there has been proposed a surface treatment such as a urethane coating. However, this treatment results in increase of the step number, and hence, it is desired to improve the surface gloss of the material per se without performing secondary processing.

An olefin type thermoplastic elastomer to be used for window shield gaskets of vehicles or various construction gaskets, for which properties similar to those of a vulcanized rubber are required, is obtained by increasing the content of an ethylene/α-olefin copolymer elastomer component in an ordinary olefin type thermoplastic elastomer.

The so-obtained thermoplastic elastomer rich in the softness is poor in the flowability in the fused state, and therefore, a window shield gasket for a vehicle or a construction gasket, for which a complicated shape is required, can hardly be prepared directly by injection molding of this thermoplastic elastomer.

Since this soft thermoplastic elastomer is excellent in profile moldability, there may be considered a method for forming the above molded article by extrusion molding. In this case, it is necessary to bond the ends of molded articles formed by profile extrusion.

This bonding is preferably accomplished according to a method in which at least two-extrusion-molded articles to be bonded are placed in a split mold and a thermoplastic elastomer having good fusion bondability is injected between the ends of the molded articles to fusion-bond the molded articles through the injected thermoplastic elastomer. In this case, it is preferred that the split mold should have a structure to which injection molding is applicable.

However, even if extrusion-molded articles of thermoplastic elastomers are bonded according to the above-mentioned method, in many cases, it is difficult to obtain bonding having a practical strength.

SUMMARY OF THE INVENTION

It is therefore a primary object of the present invention to provide an olefin type thermoplastic elastomer having excellent heat moldability and excellent elastomeric characteristics and high surface gloss of the molded article.

Another object of the present invention is to provide an olefin type thermoplastic elastomer having excellent injection moldability and high fusion bondability to a soft olefin type thermoplastic elastomer placed in an injection mold.

Still another object of the present invention is to provide a process for the preparation of an olefin type thermoplastic elastomer having the above-mentioned excellent properties.

More specifically, in accordance with the present invention, there is provided a thermoplastic elastomer composition excellent in injection fusion bondability and surface gloss, which comprises (1) an amorphous ethylene/α-olefin copolymer (a) and (2) (i) a low crystalline copolymer (b) of propylene with an α-olefin having at least 4 carbon atoms, (ii) a polymer (d) composed mainly of 1-butene or (iii) a combination of the copolymer (b) or the polymer (d) with a crystalline polymer (c) composed mainly of propylene, wherein the component (1) is present in an amount of 10 to 95% by weight based on the total amount of the components (1) and (2), the component (2) is present in an amount of 5 to 90% by weight based on the total amount of the components (1) and (2), and the component (1) or the components (1) and (2) are partially crosslinked.

In accordance with one preferred embodiment of the present invention, there is provided a thermoplastic elastomer composition set forth above, wherein a radical-polymerizable monomer (e) havibng at least two polymerizable groups is contained in an amount of 0.05 to 1% by weight based on total amount of the components (1) and (2) and the partial crosslinking is effected by grafting of said monomer.

DETAILED DESCRIPTION OF THE PREFERRED EMBODIMENTS

The amorphous ethylene/α-olefin copolymer used as the component (a) in the present invention includes a binary copolymer of ethylene with an α-olefin and a terpolymer or multi-component copolymer comprising as a third component an unconjugated diene, for example, an aliphatic diene such as 1,4-hexadiene or an alicyclic diene such as dicyclopentadiene, 5-ethylidenenorbornene, 5-meethylenenorbornene or 5-vinylnorbornene, and the copolymer (a) has a crystallization degree lower than 35%, preferably lower than 20%, as determined by X-ray diffractometry.

In case of the binary copolymer, the ethylene unit content is ordinarily 30 to 95 mole % and preferably 50 to 85 mole %, the balance being an α-olefin. The melt flow rate (190° C.) is ordinarily 0.1 to 120 g/10 min and preferably 0.1 to 20 g/10 min, and the melt flow rate (230° C.) is ordinarily 0.1 to 200 g/10 min and preferably 0.1 to 50 g/10 min. The iodine value is ordinarily smaller than 1.

In case of the terpolymer, the ethylene unit content is ordinarily 30 to 95 mole % and preferably 50 to 85 mole %, the α-olefin unit content is ordinarily 5 to 70 mole % and preferably 15 to 50 mole %, and the unconjugated diene unit content is ordinarily 1 to 10 mole % and preferably 3 to 6 mole % (a iodine value of 1 to 60, preferably 5 to 30.) The Mooney viscosity [$ML_{1+4}(100°$ C.)] is ordinarily 5 to 200 and preferably 40 to 120, and the iodine value is ordinarily 1 to 50 and preferably 5 to 30.

An ethylene/propylene copolymer (EPM) and an ethylene/1-butene copolymer (EBM) are preferred as the binary copolymer, and in these preferred copolymers, the ethylene unit content is 50 to 95 mole %, the crystallization degree is lower than 20%, the melt flow rate (190° C.) is 0.1 to 20 g/10 min and the melt flow rate (230° C.) is 0.1 to 50 g/10 min.

An ethylene/propylene/dicyclopentadiene terpolymer, an ethylene/propylene/2-ethylidene-5-norbornene terpolymer (EPDM), ethylene/1-butene/dicyclopentadiene terpolymer and an ethylene/1-butene/2-ethylidene-5-norbornene terpolymer (EBDM) are preferred as the terpolymer, and in these preferred terpolymers, the ethylene unit content is 50 to 95 mole %, the propylene or 1-butene unit content is 5 to 50 mole %, the unconjugated diene unit content is 0.1 to 20 mole % (this range corresponds ordinarily to an iodine value of 1 to 60, preferably 5 to 30), the crystallization degree is lower than 20%, the Mooney viscosity [$ML_{1+4}(100°$ C.)] is 40 to 160 and the iodine value is 5 to 30.

According to the present invention, a lowly crystalline copolymer (b) of propylene with an α-olefin having at least 4 carbon atoms is incorporated into the above-mentioned amorphous ethylene/α-olefin copolymer (a). The component (b) used in the present invention is characterized in that the compatibility with the component (a) is higher than that of other olefin resins such as polypropylene, and the component (b) is effective for prominently improving the surface gloss of a molded article and improving the injection moldability and the fusion bondability to other elastomers.

Similar effects can be attained when a polymer (d) composed mainly of 1-butene and a crystalline polymer (c) composed mainly of propylene are used in combination instead of the lowly crystalline copolymer (b) of propylene with an α-olefin having at least 4 carbon atoms. The reason is considered to be that if the polymers (d) and (c) are used in combination, a polymer chain or segment chain similar to that formed by the use of the copolymer (b) is formed under conditions causing partial crosslinking.

The low crystalline copolymer (b) of propylene with an α-olefin having at least 4 carbon atoms is prepared by copolymerizing propylene with at least one α-olefin such as 1-butene, 4-methyl-1-pentene, 1-octene or 1-decene, and the copolymer (b) has a crystallization degree lower than 40%, preferably lower than 30%, as determined by X-ray diffractometry.

The propylene unit content is ordinarily 40 to 90 mole %, the balance being an α-olefin having at least 4 carbon atoms. When at least two α-olefin are used, the total amount is regarded as the α-olefin amount.

The melt flow rate [MFR(230° C.)] of the copolymer is ordinarily 0.1 to 200 g/10 min and preferably 1 to 40 g/10 min.

As the preferred copolymer, there can be mentioned a propylene/1-butene copolymer having a propylene unit content of 55 to 85 mole %, a crystallization degree of 10 to 30% and a melt flow rate of 1 to 40 g/10 min. Copolymers of this type are described in, for example, Japanese Patent Publications No. 11322/82 and No. 36859/82.

The component (b) alone may be incorporated into the component (a), but it is preferred that the component (b) be incorporated in combination with a crystalline polyolefin (c) composed mainly of an α-olefin having at least 3 carbon atoms into component (a).

The component (c) is preferably radical-decomposable. Ordinarily, the component (c) is a homopolymer or copolymer of an α-olefin having at least 3 carbon atoms or a mixture thereof, and the crystallization degree is ordinarily higher than 40% and preferably higher than 50%, as determined by X-ray diffractometry. Component (c) may contain ethylene as a comonomer, but the ethylene unit content is ordinarily lower than 40 mole % and preferably lower than 20%.

The copolymer may be prepared by either block polymerization or random polymerization. In order to attain a crystallization degree higher than the above-mentioned lower limit, in case of random copolymerization, the content of the monomer of a smaller amount is adjusted to lower than 15 mole %, preferably lower than 10 mole %, and in case of block copolymerization, the content of the monomer of a smaller amount is adjusted to lower than 40 mole %, preferably lower than 20 mole %.

Polypropylene having a crystallization degree higher than 50% is most preferred.

As the 1-butene polymer (d) used instead of the component (b) in the present invention, there can be mentioned (i) a crystalline homopolymer of 1-butene, (ii) a crystalline copolymer of 1-butene with other α-olefin or diolefin ordinarily in an amount smaller than 10 mole %, (iii) a crystalline copolymer of 1-butene with a copolymerizable vinyl monomer such as vinyl acetate, acrylic acid or a derivative thereof ordinarily in an amount smaller than 10 mole %, (iv) a mixture of at least two members selected from the above-mentioned polymers (i), (ii) and (iii), and (v) a crystalline modified polymer obtained by grafting styrene, a derivative thereof, an unsaturated carboxylic acid or a derivative thereof to a member selected from the above-mentioned polymers (i) through (iv) or a polymer obtained by partially halogenating a member selected from the above-mentioned polymers (i) through (iv).

This 1-butene polymer (d) is combined with the above-mentioned crystalline propylene polymer (c).

Supposing that the total amount of the components (a), (b) and (c) is 100 parts by weight, in the present invention, the amorphous ethylene/α-olefin copolymer (a) is used in an amount of 10 to 95 parts by weight, preferably 10 to 60 parts by weight, and the lowly crystalline copolymer (b) of propylene with an α-olefin having at least 4 carbon atoms or the combination of the crystalline polyolefin (c) and the 1-butene polymer (d) is used in an amount of 5 to 90 parts by weight, preferably 10 to 60 parts by weight. When the amount of the component (b) or the combination of the components (c) and (d) is too small and is below the above-mentioned range, the surface gloss of a molded article, the injection fusion bondability and the bonding strength of a bonded article are degraded as compared with these properties attained when the amount is within the range specified in the present invention.

If the amount of the component (a) is too small and below the above-mentioned range, the elastomeric property is degraded as compared with the elastomeric property attained when the amount of the component (a) is within the range specified in the present invention.

When the combination of the components (d) and (c) is used instead of the component (b), it is preferred that the components (d) and (c) be used in such amounts that the weight ratio of component (d)/component (c) be in the range of from 100/0 to 10/90, especially from 80/20 to 20/80.

When the component (b) is used in combination with the component (c), it is preferred that they be used in such amounts that the weight ratio of component (b)/component (c) is in the range of from 100/0 to 90/10, especially from 80/20 to 20/80.

In the present invention, various methods may be adopted for forming a partially crosslinked elastomer composition from the above-mentioned components.

In accordance with one embodiment of the present invention, there is provided a process for the preparation of a thermoplastic elastomer composition excellent in injection fusion moldability and surface gloss, which comprises heating and kneading a composition comprising an amorphous ethylene/α-olefin copolymer (a) and a radical-decomposable crystalline polyolefin (c), especially polypropylene, under a radical-forming condition to obtain a partially crosslinked thermoplastic elastomer, and fusion-kneading the partially crosslinked thermoplastic elastomer and a lowly crystalline copolymer (b) of propylene with an α-olefin having at least 4 carbon atoms or a 1-butene polymer (d).

In accordance with another embodiment of the present invention, there is provided a process for the preparation of a thermoplastic elastomer composition excellent in surface gloss, which comprises adding an organic peroxide (f) and a radical-polymerizable monomer (e) having at least two polymerizable groups to a composition comprising an amorphous ethylene/α-olefin copolymer (a), a lowly crystalline copolymer (b) of propylene with an α-olefin having at least 4 carbon atoms and optionally a crystalline polyolefin (c) composed mainly of an α-olefin having at least 3 carbon atoms, and dynamically heat-treating the resulting mixture.

In accordance with still another embodiment of the present invention, there is provided a thermoplastic elastomer composition excellent in surface gloss, which comprises dynamically heat-treating a composition comprising a crystalline polyolefin (c) composed mainly of an α-olefin having at least 3 carbon atoms, an amorphous ethylene/α-olefin copolymer (a), an organic peroxide (f) and a radical-polymerizable monomer (e) having at least two polymerizable groups, adding a low crystalline copolymer (b) of propylene with an α-olefin having at least 4 carbon atoms or a 1-butene polymer (d) and fusion-kneading the resulting mixture, or adding the low crystalline copolymer (b) to said composition when said composition is fusion-kneaded.

In the present invention, by the term "radical-forming condition" is meant not only a condition forming radicals by decomposition of an added radical forming agent but also a condition forming radicals by irradiation with ionizing radiations or electron beams.

By the term "dynamic heat treatment" is meant a heat treatment conducted under a shearing force. The applied shearing force is 10 to $10^4$ sec$^{-1}$, preferably $10^2$ to $10^3$ sec$^{-1}$, expressed as the shear rate, the heat treatment temperature is 150° to 280° C., preferably 170° to 240° C., and the heat treatment time is 1 to 20 minutes, preferably 3 to 10 minutes.

The partial crosslinking is effected by the action of the free radical on the tertiary carbon atom, which is generated in the polymer chain of the above-mentioned components. Generally, the above component (a) and the above component (b) or the combination of the components (d) and (c) are partially crosslinked through the chain of an α-olefin such as propylene to form a partially crosslinked elastomer.

This partial crosslinking structure can be accomplished very assuredly by incorporating and grafting a radical-polymerizable monomer (e) having at least two polymerizable groups in the molecule, and the degree of the partial crosslinking attained by this method is such that excellent injection fusion moldability and surface gloss are obtained.

As examples of the radical-polymerizable monomer (e) having at least two polymerizable groups, to be used in combination with the radical-forming agent, the following compounds can be mentioned.

(e-1) Aromatic compounds such as divinylbenzene (DVB), isopropenylstyrene and diisopropenylbenzene.

(e-2) Aliphatic compounds such as ethylene glycol dimethacrylate, polyethylene glycol dimethacrylate, trimethylol propane trimethacrylate and allyl methacrylate.

(e-3) Heterocyclic compounds such as triallyl isocyanurate.

Among these compounds, p-divinylbenzene and p-diisopropenylbenzene are preferred.

The typical instance of the radical-forming agent to be used for the production of the composition of the present invention is an organic peroxide, and any of organic peroxides decomposable at a temperature higher than the softening point of the polymer component which is most difficultly softened among the components of the composition can be used in the present invention.

As the organic peroxide (f) to be used in the present invention, there can be mentioned, for example, aromatic compounds such as dibenzoyl peroxide, dicumyl peroxide and 1,3-bis(t-butylperoxyisopropyl)benzene (marketed under the tradename of "Parkadox 14"), aliphatic compounds such as di-t-butyl peroxide, dilauroyl peroxide, 2,5-dimethyl-2,5-bis(t-butylperoxy)hexane (marketed under the tradename of "Perhexa 25B"), 2,5-dimethyl-2,5-bis(t-butylperoxy)hexene-3 and 2,5-dimethyl-2,5-bis(t-butylperoxy)hexyne-3 (marketed under the tradename of "Perhexyne"), aromatic-aliphatic compounds such as di(t-butylperoxy)perbenzoate, and alicyclic compounds such as p-menthane peroxide. Bis-peroxide type compounds are preferred among these compounds.

A crosslinking assistant may be used for the partial crosslinking treatment. As the crosslinking assistant, there can be mentioned, for example, p-quinone oxime, p,p'-dibenzoylquinone dioxime, N-methyl-N,N-dinitrosoaniline, nitrobenzene, diphenylguanidine and trimethylolpropane-N,N'-m-phenylene dimaleimide.

Each of the amounts added of the radical-polymerizable monomer (e) having at least two polymerizable groups and the organic peroxide (f) as a typical instance of the radical initiator is ordinarily 0.05 to 3 parts and preferably 0.1 to 1 part by weight per 100 parts by weight of the total amount of the polymer components.

Kneading is carried out in the molten state of the above-mentioned composition at a temperature within the above-mentioned range, especially at a temperature at which the half-value period of the organic peroxide used is within 1 minute. It is preferred that kneading be carried out in a non-opened type apparatus in an atmosphere of an inert gas such as nitrogen or carbon dioxide gas.

As the kneading apparatus, there may be used a mixing roll, an intensive mixer such as a Benbury mixer, a kneader or a monoaxial or biaxial extruder. A kneading apparatus of the non-opened type is preferred.

The composition of the present invention may further comprise a softener (spreading oil or plasticizer), a small amount of other elastomer such as butyl rubber (IIR) or polyisobutylene, carbon black, white carbon, other modifier, a filler, an antioxidant, an oxidation stabilizer, a weathering stability, a photostabilizer, a processing assistant, an antistatic agent, a pigment and the like according to intended uses.

The present invention will now be described in detail with reference to the following examples that by no means limit the scope of the invention. Incidentally, in these examples, all of "parts" and "%" are by weight unless otherwise indicated. Furthermore, the surface gloss of the molded article was determined at an incident angle of 60° according to the method of JIS Z-8741.

REFERENTIAL EXAMPLE 1

In a Banbury mixer, 70 parts of an ethylene/propylene/2-ethylidene-5-norbornene copolymer rubber having an ethylene unit content of 78 mole %, a Mooney viscosity $ML_{1+4}(100°$ C.) of 70 and an iodine value of 15 (hereinafter referred to as "EDPM"), 30 parts of polypropylene having a melt flow rate (230° C., 21.6 Kg) of 11 g/10 min and a density of 0.91 g/cc (hereinafter referred to as "PP") and 0.3 part of tetrakis[methylene(3,5-di-t-butyl-4-hydroxy)hydrocynnamate]methane as the antioxidant were kneaded at 180° C. for 5 minutes in a nitrogen atmosphere, and the kneaded composition was shaped into a sheet by passing it through rolls and was pelletized by a sheet cutter. Then, 100 parts of the pelletized composition was mixed for 1 minute by a Henschel mixer with a liquid formed by dispersing 0.3 part of 1,3-bis(t-butylperoxyisopropyl)benzene as the organic peroxide in 0.5 part of divinylbenzene to stick the solution of the peroxide uniformly on the surface of the pelletized composition. Then, the pellet was charged into an extruder and was then extruded while dynamically heat-treating the composition at 210° C. in a nitrogen atmosphere for a residence time of 5 minutes to obtain a thermoplastic elastomer pellet.

The pellet was molded into a rectangular plate having a size of 150 mm×120 mm×3 mm by an injection molding machine (Dina-Melter supplied by Meiki Seisakusho). The gloss was measured to obtain the results shown in Table 1.

EXAMPLE 1

By a Henschel mixer, 70 parts of the thermoplastic elastomer pellet obtained in Referential Example 1 was mixed with 30 parts of a lowly crystalline propylene/1-butene copolymer pellet having a propylene unit content of 70 mole % and a melt flow rate (230° C.) of 7 g/10 min (hereinafter referred to as "PBR"), and the mixture was charged in an extruder and was extruded at 210° C. in a nitrogen atmosphere for a residence time of 5 minutes to obtain an intended composition.

By using the same molding machine as used in Referential Example 1, the composition was injection-molded in a rectangular plate having the same size as that of the rectangular plate prepared in Referential Example 1, and the surface gloss was measured to obtain the results shown in Table 1.

COMPARATIVE EXAMPLE 1

A rectangular plate having the same size as that of the rectangular plate prepared in Example 1 was molded by using the same injection molding as used in Example 1 in the same manner as described in Example 1 except that an ethylene/vinyl acetate copolymer having a vinyl acetate unit content of 14 mole % and a melt flow rate (190° C.) of 15 g/min. The surface gloss was measured. The obtained results are shown in Table 1.

EXAMPLE 2

The same EPDM, PP, PBR and antioxidant as used in Example 1 were charged in a Banbury mixer in amounts of 50 parts, 20 parts, 30 parts and 0.3 part, respectively, and the mixture was kneaded at 180° C. in a nitrogen atmosphere for 5 minutes. The kneaded mixture was passed through rolls to form a sheet and the sheet was pelletized by a sheet cutter. Then, 100 parts of the pellet was contacted with a liquid formed by dispersing 0.3 part of the same organic peroxide as used in Example 1 in 0.5 part of divinylbenzene by a Henschel mixer to stick the solution unformly on the surface of the pellet. Then, the pellet was charged into an extruder and was extruded while dynamically heat-treating the pellet at 210° C. in a nitrogen atmosphere for a residence time of 5 minutes to obtain a pellet of a thermoplastic elastomer composition.

By the same injection molding machine as used in Referential Example 1, a rectangular plate having the same size as that of the rectangular plate prepared in Referential Example 1 was prepared from this composition, and the surface gloss was measured. The obtained results are shown in Table 1.

COMPARATIVE EXAMPLE 2

A thermoplastic elastomer was obtained in the same manner as described in Example 2 except that the same PP as used in Referential Example 1 was used instead of 30 parts of PBR, and a rectangular plate was prepared by injection molding and the surface gloss of the rectangular plate was measured. The obtained results are shown in Table 1.

From the results shown in Table 1, it will readily be understood that molded articles prepared by injecting molding of the compositions of the present invention are excellent over molded articles prepared from comparative compositions in the surface gloss, and that the molded articles of the present invention are comparable to the comparative molded articles in the basic physical properties.

TABLE 1

|  | Referential Example 1 | Example 1 | Comparative Example 1 | Example 2 | Comparative Example 2 |
| --- | --- | --- | --- | --- | --- |
| Composition (parts by weight) |  |  |  |  |  |
| EPDM | 70 | 70 | 70 | 50 | 50 |
| PP | 30 | 30 | 30 | 20 | 50 |
| PBR | — | 43* | — | 30 | — |
| EVA | — | — | 43* | — | — |

TABLE 1-continued

|  | Referential Example 1 | Example 1 | Comparative Example 1 | Example 2 | Comparative Example 2 |
|---|---|---|---|---|---|
| POXD | 0.3 | 0.3 | 0.3 | 0.3 | 0.3 |
| DVB | 0.5 | 0.5 | 0.5 | 0.5 | 0.5 |
| Surface Gloss (%) | 10 | 50 | 22 | 40 | 20 |
| Basic Physical Properties |  |  |  |  |  |
| Stress (kg/cm$^2$) at 100% % elongation | 49 | 60 | 55 | 50 | 90 |
| Tensile strength (kg/cm$^2$) | 100 | 130 | 110 | 160 | 170 |
| Elongation (%) at tensile break | 500 | 560 | 550 | 700 | 600 |
| Spring hardness | 88 | 93 | 86 | 94 | 97 |

*The value per 100 parts, which was converted from 30 parts per 70 parts of the composition obtained by dynamically heat-treating EPDM/PP/POXD/DVB (=70/30/0.3/0.5).

REFERENTIAL EXAMPLE 2

In a Banbury mixer, 75 parts of an ethylene/propylene/2-ethylidene-5-norbornene copolymer rubber having an ethylene content of 78 mole %, an iodine value of 15 and a Mooney viscosity $ML_{1+4}(100°$ C.) of 70 (hereinafter referred to as "EPDM"), 15 parts of crystalline polypropylene having a melt flow rate (230° C., 2.16 kg) of 11 and a density of 0.91 g/cc (hereinafter referred to as "PP"), 10 parts of an isobutene/isoprene copolymer rubber (hereinafter referred to as "IIR") and 0.3 part of tetrakis[methylene(3,5-di-t-butyl-4-hydroxyphenyl)propionate]methane as the antioxidant were kneaded at 180° C. for 5 minutes in a nitrogen atmosphere. The kneaded mixture was passed through rolls and pelletized by a sheet cutter. Then, the pellet was mixed with a liquid prepared by dispersing 0.3 part of 1,3-bis-(t-butylperoxyisopropyl)benzene in 0.5 part of divinylbenzene in a Henschel mixer to stick the solution uniformly on the surface of the pellet. Then, the pellet was extruded through an extruder at 210° C. in a nitrogen atmosphere for a residence time of 5 minutes to effect a dynamic heat treatment and obtain a thermoplastic elastomer.

A sheet having a size of 120 mm×100 mm×2 mm was molded from the thermoplastic elastomer by using an injection molding machine. A test piece having a width of 25 mm was cut from the sheet, and the test piece was pulled in the longitudinal direction and the stress at break was measured. It was found that the stress at break was 40 kg/cm$^2$. The surface gloss was 8%.

EXAMPLE 3

In a Banbury mixer, 70 parts of EPDM of an ethylene/propylene/2-ethylidene-5-norbornene copolymer having an ethylene content of 78 mole %, an iodine value of 15 and a Mooney viscosity $ML_{1+4}(100°$ C.) of 70, 30 parts of a pellet of a lowly crystalline propylene/1-butene copolymer having a propylene unit content of 70 mole % and a melt flow rate (230° C.) of 7 g/10 min and 0.3 part of tetrakis[methylene(3,5-di-t-butyl-4-hydroxyphenyl)propionate]methane were kneaded at 180° C. for 5 minutes in a nitrogen atmosphere. The kneaded mixture was passed through rolls and pelletized by a sheet cutter. By a Henschel mixer, 100 parts of the pellet was mixed with a solution formed by dispersing 0.3 part of 1,3-bis(t-butylperoxyisopropyl)benzene in 0.5 part of divinylbenzene to stick the solution uniformly on the surface of the pellet. Then, the pellet was extruded through an extruder at 210° C. for a residence time of 5 minutes in a nitrogen atmosphere to effect a dynamic heat treatment and a thermoplastic elastomer. The strength at break of the thermoplastic elastomer was measured according to the method described in Referential Example 2. It was found that the strength at break was 90 kg/cm$^2$.

The injection-molded sheet obtained in Referential Example 2 was cut into two parts and placed in the split mold used for formation of the sheet, and the thermoplastic elastomer obtained in Example 3 was injection-fused to bond the cut parts of the sheet. The bonding strength was measured and the surface gloss of the fusion-bonded portion was measured according to JIS Z-8741. The obtained results are shown in Table 2.

COMPARATIVE EXAMPLE 3

The procedures of Example 3 were repeated in the same manner except that the thermoplastic elastomer obtained in Referential Example 2 was injection-fused, and the bonding strength was measured. The obtained results are shown in Table 2.

EXAMPLE 4

In a Henschel mixer, 80 parts of the thermoplastic elastomer obtained in Referential Example 2 was mixed with 20 parts of a lowly crystalline propylene/1-butene copolymer having a propylene unit content of 70 mole % and a melt flow rate (230° C.) of 7 g/10 min (hereinafter referred to as "PBR"), and a pellet of the mixture was extruded through an extruder at 210° C. for a residence time of 5 minutes in a nitrogen atmosphere to obtain an intended composition. The injection-molded sheet obtained in Referential Example 2 was cut into two parts and placed in the split mold used for formation of the sheet, and the thermoplastic elastomer composition obtained in Example 4 was injection-fused to bond the cut parts of the sheet. The bonding strength was measured and the surface gloss of the fusion-bonded portion was measured according to JIS Z-8741. The obtained results are shown in Table 2.

COMPARATIVE EXAMPLE 4

A thermoplastic elastomer was prepared in the same manner as described in Example 4 except that 20 parts of an ethylene/vinyl acetate copolymer resin having a melt flow rate (190° C., 2.16 kg) of 15, a density of 0.93 g/cc and a vinyl acetate content of 14% by weight (hereinafter referred to as "EVA") was used instead of 20 parts of PBR. The injection-molded sheet obtained in Referential Example 3 was cut into two parts and placed in the split mold used for formation of the sheet, and the thermoplastic elastomer composition obtained in Comparative Example 4 was injection-fused. The bonding strength was measured. The obtained results are shown in Table 2.

TABLE 2

|  | Example 3 | Comparative Example 3 | Example 4 | Comparative Example 4 |
|---|---|---|---|---|
| Resin | Referential Example 2 | Referential Example 2 | Referential Example 2 | Referential Example 2 |
| Bonded Adhesive Resin | Referential Example 3 | Referential Example 2 | Referential Example 4 | Comparative Example 4 |
| Strength (kg/cm$^2$) at Break | 28 | 10 | 32 | 15 |
| State of Fracture | partial material fracture | peeling | partial material fracture | peeling |
| Gloss (60°) | 40 | 8 | 45 | 20 |

From the results shown in Table 2, it will readily be understood that the composition of the present invention can be tightly injection-fusion-bonded to a molded article composed of a thermoplastic elastomer.

More specifically, the bonding strengths at break of the sheets of Examples 3 and 4 are 28 and 32 kg/cm$^2$, respectively, which are about 2 times the strengths at break of the sheets of Comparative Examples, which are 10 and 15 kg/cm$^2$, respectively. Moreover, the state of fracture is only a partial material fracture. Accordingly, it is seen that bonding is not mere adhesion but can be regarded as fusion of both the materials.

Incidentally, the strength at break in Referential Example 2 is 40 kg/cm$^2$ but it is a strength of a single plate. The fact that the strengths at break of the sheets obtained in Examples 3 and 4 correspond to 70 and 80% of the strength attained in Referential Example 2 indicates that surprisingly high fusion bonding can be formed between different materials when the composition of the present invention is used.

EXAMPLE 5

In a Banbury mixer, 70 parts of EPDM having an ethylene content of 78 mole %, an iodine value of 15 and a Mooney viscosity $ML_{1+4}(100°$ C.) of 70, 10 parts of crystalline PP having a melt flow rate (230° C., 2.16 kg) of 11 and a density of 0.91 g/cc, 20 parts of a poly-1-butene resin having a melt flow rate (190° C., 2.16 kg) of 2.0 (hereinafter referred to as "PB-1") were kneaded at 180° C. for 5 minutes in a nitrogen atmosphere, and the kneaded mixture was passed through rolls and pelletized by a sheet cutter. Then, in a Henschel mixer, the pellet was mixed with a solution obtained by dispersing 0.3 part of 1,3-bis(t-butylperoxyisopropyl)benzene in 0.5 part of divinylbenzene to stick the solution uniformly on the surface of the pellet. Then, the pellet was extruded through an extruder at 210° C. for a residence time of 5 minutes in a nitrogen atmosphere to effect a dynamic heat treatment and obtain a thermoplastic elastomer. When the strength at break was measured according to the method described in Referential Example 2, it was found that the strength at break was 73.5 kg/cm$^2$.

The injection-molded sheet obtained in Referential Example 2 was cut into two parts and placed in the split mold used for formation of the sheet, and the thermoplastic elastomer of Example 5 was injection-fused. The bonding strength was measured. The obtained results are shown in Table 3.

COMPARATIVE EXAMPLE 5

The procedures of Example 5 were repeated in the same manner except that the thermoplastic elastomer obtained in Referential Example 2 was injection-fused, and the bonding strength was measured. The obtained results are shown in Table 3.

EXAMPLE 6

In a Henschel mixer, 80 parts of the thermoplastic elastomer was mixed with 20 parts of lowly crystalline PB-1 having a melt flow rate (190° C.) of 20, and the pellet was extruded through an extruder at 210° C. for a residence time of 5 minutes in a nitrogen atmosphere to obtain an intended composition. The injection-molded sheet obtained in Referential Example 2 was cut into two parts and placed in the split mold used for formation of the sheet, and the thermoplastic elastomer composition of Example 6 was injection-fused. The bonding strength was measured. The obtained results are shown in Table 3.

COMPARATIVE EXAMPLE 6

A thermoplastic elastomer was prepared in the same manner as described in Example 6 except that 20 parts of an ethylene/vinyl acetate copolymer resin having a melt flow rate (190° C., 2.16 kg) of 15, a density of 0.93 g/cc and a vinyl acetate content of 14% by weight (hereinafter referred to as "EVA") was used instead of 20 parts of PB-1. The injection-molded sheet obtained in Referential Example 2 was cut into two parts and placed in the split mold used for formation of the sheet, and the thermoplastic elastomer composition of Comparative Example 6 was injection-fused and the bonding strength was measured. The obtained results are shown in Table 3.

TABLE 3

|  | Example 5 | Comparative Example 5 | Example 6 | Comparative Example 6 |
|---|---|---|---|---|
| Resin | Referential Example 2 | Referential Example 2 | Referential Example 2 | Referential Example 2 |
| Bonded Adhesive Resin | Referential Example 5 | Referential Example 2 | Referential Example 6 | Comparative Example 6 |
| Strength (kg/cm$^2$) at Break | 35 | 10 | 30 | 15 |
| State of Fracture | partial material fracture | peeling | partial material fracture | peeling |

From the results shown in Table 3, it will readily be understood that the composition of the present invention can be tightly injection-fusion-bonded to a molded article composed of a thermoplastic elastomer.

More specifically, the bonding strengths at break of the sheets of Examples 5 and 6 are 35 and 30 kg/cm$^2$, respectively, which are about 2 times the strengths at break of the sheets of Comparative Examples 5 and 6, which are 10 and 15 kg/cm$^2$, respectively. Moreover, the state of fracture is only a partial material fracture. Accordingly, it is seen that bonding is not mere adhesion but can be regarded as fusion of both the materials.

Incidentally, the strength at break in Referential Example 2 is 40 kg/cm$^2$ but it is a strength of a single plate. The fact that the strengths at break of the sheets obtained in Examples 5 and 6 correspond to 90 and 75% of the strength at break attained in Referential Example 2 indicates that surprisingly high fusion bonding can be formed between different materials when the composition of the present invention is used.

We claim:

1. A thermoplastic elastomer composition having excellent injection fusion bondability and surface gloss, which comprises an amorphous ethylene/α-olefin copolymer (a) and a propylene/1-butene copolymer having a propylene unit content of 55 to 85 mole %, a crystallization degree of 10 to 30% and a melt flow rate of 1 to 40 g/10 min (b) wherein component (a) is present in an amount of 10 to 95% by weight based on the total amount of components (a) and (b), and component (a) or components (a) and (b) are partially crosslinked, and which further comprises a radical-polymerizable monomer (c) having at least two polymerizable groups in an amount of 0.05 to 1% by weight based on the total amount of components (a) and (b), wherein the partial crosslinking is effected by grafting of said monomer.

2. The composition as set forth in claim 1, wherein the copolymer (a) is an ethylene/propylene copolymer or ethylene/1-butene copolymer having an ethylene unit content of 50 to 95 mole % and a crystallization degree lower than 20%.

3. The composition as set forth in claim 1, wherein the copolymer (a) is a terpolymer having an ethylene unit content of 50 to 95 mole %, a propylene or 1-butene unit content of 5 to 50 mole %, an unconjugated diene unit content of 0.1 to 20 mole % and a Mooney viscosity $ML_{1+4}$ (100° C.) of 40 to 160.

4. The composition as set forth in claim 1, wherein the copolymer (b) is a propylene/1-butene copolymer having a propylene unit content of 55 to 85 mole %, a crystallization degree of 10 to 30% and a melt flow rate of 1 to 40 g/10 min.

5. A process for the preparation of a thermoplastic elastomer composition having excellent surface gloss, which comprises adding an organic peroxide (f) and a radical-polymerizable monomer (e) having at least two polymerizable groups to a composition comprising an amorphous ethylene/α-olefin copolymer (a), a propylene/1-butene copolymer having a propylene unit content of 55 to 85 mole %, a crystallization degree of 10 to 30% and a melt flow rate of 1 to 40 g/10 min (b) and optionally a polypropylene having a crystallization degree higher than 50% (c), and dynamically heat-treating the resultant mixture.

* * * * *